(12) United States Patent
Barth et al.

(10) Patent No.: US 11,893,962 B2
(45) Date of Patent: Feb. 6, 2024

(54) GRAPHICS PROCESSOR SWITCHING BASED ON COUPLED DISPLAY DEVICES

(71) Applicant: Hewlett-Packard Development Company, L.P., Spring, TX (US)

(72) Inventors: Justin Barth, Fort Collins, CO (US); Peter Andrew Seiler, Fort Collins, CO (US); Tze-Shyang Ma, Taipei (TW)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 0 days.

(21) Appl. No.: 17/793,665

(22) PCT Filed: Feb. 18, 2020

(86) PCT No.: PCT/US2020/018594
§ 371 (c)(1),
(2) Date: Jul. 19, 2022

(87) PCT Pub. No.: WO2021/167591
PCT Pub. Date: Aug. 26, 2021

(65) Prior Publication Data
US 2023/0050397 A1    Feb. 16, 2023

(51) Int. Cl.
*G06T 1/20*     (2006.01)
*G09G 5/36*     (2006.01)
*G06F 3/14*     (2006.01)

(52) U.S. Cl.
CPC .......... *G09G 5/363* (2013.01); *G06F 3/1431* (2013.01); *G06T 1/20* (2013.01); *G09G 2360/04* (2013.01)

(58) Field of Classification Search
CPC ...... G06T 1/20; G09G 5/363; G09G 2360/06; G09G 2370/12; G09G 2360/04; G09G 2360/10; G09G 2370/22
See application file for complete search history.

(56) References Cited

U.S. PATENT DOCUMENTS

| | | | |
|---|---|---|---|
| 7,623,131 B1 | 11/2009 | Johnson | |
| 7,667,707 B1 | 2/2010 | Margulis | |
| 8,542,240 B2 | 9/2013 | Nath | |
| 8,564,599 B2 | 10/2013 | Niederauer et al. | |
| 8,810,586 B2 | 8/2014 | Sudo | |
| 10,019,778 B2 | 7/2018 | Sierra et al. | |
| 10,224,003 B1 | 3/2019 | Akiyama et al. | |
| 2012/0050260 A1 | 3/2012 | Cheng et al. | |
| 2012/0092351 A1 | 4/2012 | Barnes | |
| 2016/0118017 A1 | 4/2016 | Huang et al. | |

*Primary Examiner* — Hau H Nguyen
(74) *Attorney, Agent, or Firm* — Knobbe, Martens, Olson & Bear, LLP (57) ABSTRACT

In one example in accordance with the present disclosure, a computing device is described. The computing device includes a number of ports. Each port receives a connection to a display device. A first port is coupled to the first graphics processor which supports a number of display devices and a second graphics processor. The computing device also includes a controller. The controller determines when a number of coupled display devices is greater than the number of display devices supported by the first graphics processor and switches the first port from being driven by the first graphics processor to be driven by the second graphics processor.

16 Claims, 7 Drawing Sheets

GRAPHICS PROCESSOR SWITCHING BASED ON COUPLED DISPLAY DEVICES

BACKGROUND

A computing device refers to a combination of hardware components such as processors and memory devices that interoperate to carry out any number of functions. For example, a computing device can present information to a user and may also allow a user to manipulate information. As a specific example, via a word-processing application a user can create a digital document. Examples of computing devices include desktop computers, laptop computers, and tablets. Display devices are coupled to computing devices to provide an output that is accessible to a user.

BRIEF DESCRIPTION OF THE DRAWINGS

The accompanying drawings illustrate various examples of the principles described herein and are part of the specification. The illustrated examples are given merely for illustration, and do not limit the scope of the claims.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations that align with the description; however, the description is not limited to the examples and/or implementations provided in the drawings.

DETAILED DESCRIPTION

Computing devices are coupled to display devices which output visual information generated by the computing device. These display devices may also provide a visual interface through which a user can manipulate data or otherwise execute operations using the computing device hardware resources. For example, the display devices may present a video editing interface through which a user can view and edit video files.

In some cases, a computing device may be coupled to more than one display device. For example, users on a day-to-day basis may interact with a computing device that includes two monitors so as to be able to view more information at the same time. In some cases, even more display devices are coupled to a single computing device. Accordingly, the computing device may include a number of ports through which the display devices are coupled to the computing device. To operate the display devices, a computing device may include a graphics processor which is a specialized electronic circuit for performing the complex operations related to rendering graphics or otherwise displaying content on the display device. That is, a graphics processor affects the visual display of the computing device operations on the display devices.

While such graphics processors increase the quality of graphic rendering on a computing device, affecting such things as video resolution and refresh rate, further developments may enhance the overall user experience.

For example, a computing device may incorporate multiple graphics processors, one having higher processing capabilities than the other. During operation, when such a higher-performance graphics processor is installed, the computing device may automatically disable the lower-performance graphics processor, leaving the higher-performance graphics processor to drive all of the coupled display devices. In some cases, the lower-performance graphics processor may be disabled to reduce the overall power consumption of the compute device. Moreover, just having the higher-performance graphics processor enabled ensures that users receive maximum performance from all display devices connected to the computing device. However, this may limit the maximum number of display devices that the computing device can support to the number supported by the higher-performance graphics processor.

Accordingly, the present specification, to support additional displays, allows users to use both the graphics processors. That is, at least one of the display output ports is coupled to both graphics processors and can be switched to be driven by either. Specifically, the present specification automates the process of enabling the second graphics processor and switching one of the display output ports from the first, and higher performance, graphics processor, to the second, and potentially lower performance, graphics processor when more displays are connected to the computing device than can be supported by the first graphics processor alone. For example, the computing device may 1) receive a signal of more display devices being coupled to the computing device display ports, 2) enable the second graphics processor, and 3) switch one of the display outputs to be driven by the second graphics processor rather than the first graphics processor.

The present specification describes a system including a number of ports, where each port is to receive a connection to a display device. From the number of ports, a first port is coupled to both a first graphics processor which supports a number of display devices and a second graphics processor. The computing device also includes a controller to 1) determine when a number of coupled display devices is greater than the number of display devices supported by the first graphics processor and 2) switch the first port from being driven by the first graphics processor to be driven by the second graphics processor.

The present specification also describes a method. According to the method, it is detected when more display devices are coupled to a computing device than are supported by a first graphics processor of the computing device. Responsive to this detection, a second graphics processor is enabled and a first port is switched from being driven by the first graphics processor to be driven by the second graphics processor.

The present specification also describes a non-transitory machine-readable storage medium encoded with instructions executable by a processor. The machine-readable storage medium includes instructions executed responsive to plugging in a display device to a computing device port. The executes are executable by the processor to 1) detect when more display devices are coupled to the computing device than are supported by an installed graphics processor of the computing device, 2) enable an integrated graphics processor, and 3) switch a first port from being driven by the installed graphics processor to be driven by the integrated graphics processor.

Such systems and methods 1) allow for coupling multiple display devices to a computing device; 2) visually present information to a user in a more effective manner; and 3) enhance end-user experience by reducing effort to support greater display configurations, as examples.

As used in the present specification and in the appended claims, the terms "controller" may refer to electronic components which may include a processor and memory. The processor may include the hardware architecture to retrieve executable code from the memory and execute the executable code. As specific examples, the controller as described herein may include computer readable storage medium, computer readable storage medium and a processor, an application specific integrated circuit (ASIC), a semiconductor-based microprocessor, a central processing unit (CPU), and a field-programmable gate array (FPGA), and/or other hardware device.

The memory may include a computer-readable storage medium, which computer-readable storage medium may contain, or store computer-usable program code for use by or in connection with an instruction execution system, apparatus, or device. The memory may take many types of memory including volatile and non-volatile memory. For example, the memory may include Random-Access Memory (RAM), Read-Only Memory (ROM), optical memory disks, and magnetic disks, among others.

Figure 1:
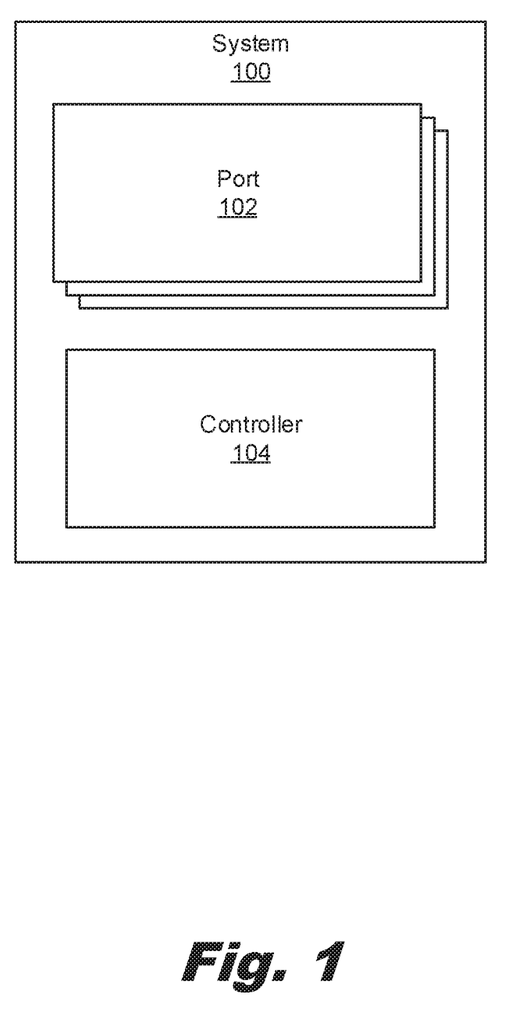
FIG. 1 is a block diagram of a system for switching graphics processors based on coupled display devices, according to an example of the principles described herein.

Turning now to the figures, FIG. 1 is a block diagram of a system (100) for switching graphics processors based on coupled display devices, according to an example of the principles described herein. The system (100) may include a number of ports (102), each to receive a connection to a display device. A port (102) refers to an interface through which a display device is coupled to a graphics processor. For example, an electrical cable from the display device may have a connector that is inserted into a port (102) and establishes an electrical connection, allowing graphics and videos generated by a computing device in which the system (100) is incorporated to be rendered on the display device. In an example, at least one port (102) may include an internal connection inside the computing device for an integrated display that is connected as part of the system (100). The port (102) may communicate over any variety of protocols and in some cases multiple protocols. Examples of protocols that may be used include DisplayPort (DP), High-Definition Multimedia Interface (HDMI), Universal Serial Bus type C (USB-C), Thunderbolt, Digital Video Interface (DVI), and Video Graphics Array (VGA).

As described above, at least one port (102), for example a first port (102), is coupled to both a first graphics processor and a second graphics processor such that it may be driven by either. A graphics processor refers to a specialized electronic circuit that performs operations related to the rendering of graphics and video. It may be the case that a computing device has multiple graphics processors. Specifically, in the examples described herein, a computing device may include a first graphics processor and a second graphics processor. Either of the first graphics processor and the second graphics processor may be either installed or integrated. That is, the first graphics processor may be either installed or integrated and the second graphics processor may be either installed or integrated. As a particular example, the first graphics processor may be integrated meaning it is manufactured and placed by a computing device manufacturer. In another example, an integrated graphics processor is co-located in the same integrated circuit package as a central processing unit (CPU), which may be placed by the computing device manufacturer, or potentially installed by the end user as an upgrade to the computing device.

In another example, the first graphics processor may be an installed graphics processor, such as a stand-alone graphics processor that is installed into the computing device after its initial manufacturing and/or sale. For example, a user may update the computing device to add a new graphics processor. Similarly, the second graphics processor described below may be an installed or integrated graphics processor.

Note that the different graphic processors may have different capabilities. For example, the first graphics processor may be able to render graphics at a higher resolution with a higher refresh rate and may support more computing devices. For example, the first graphics processor may include hardware and processing resources to support up to four display devices at a first resolution. The second graphics processor may include hardware and processing resources to support up to two display devices at a second, and lower, resolution.

In some examples, the second graphics processor is to be disabled when the number of coupled display devices is less than the number of display devices supported by the first graphics processor. This may be done to maximize the user experience by ensuring that the higher quality and power first graphics processor is used instead of the second graphics processor which may be a lower quality. This may also be done to reduce the overall power consumption of the computing device. However, as described above, a user may desire to couple more display devices to a computing device than is supported by the first graphics processor.

Figure 5:
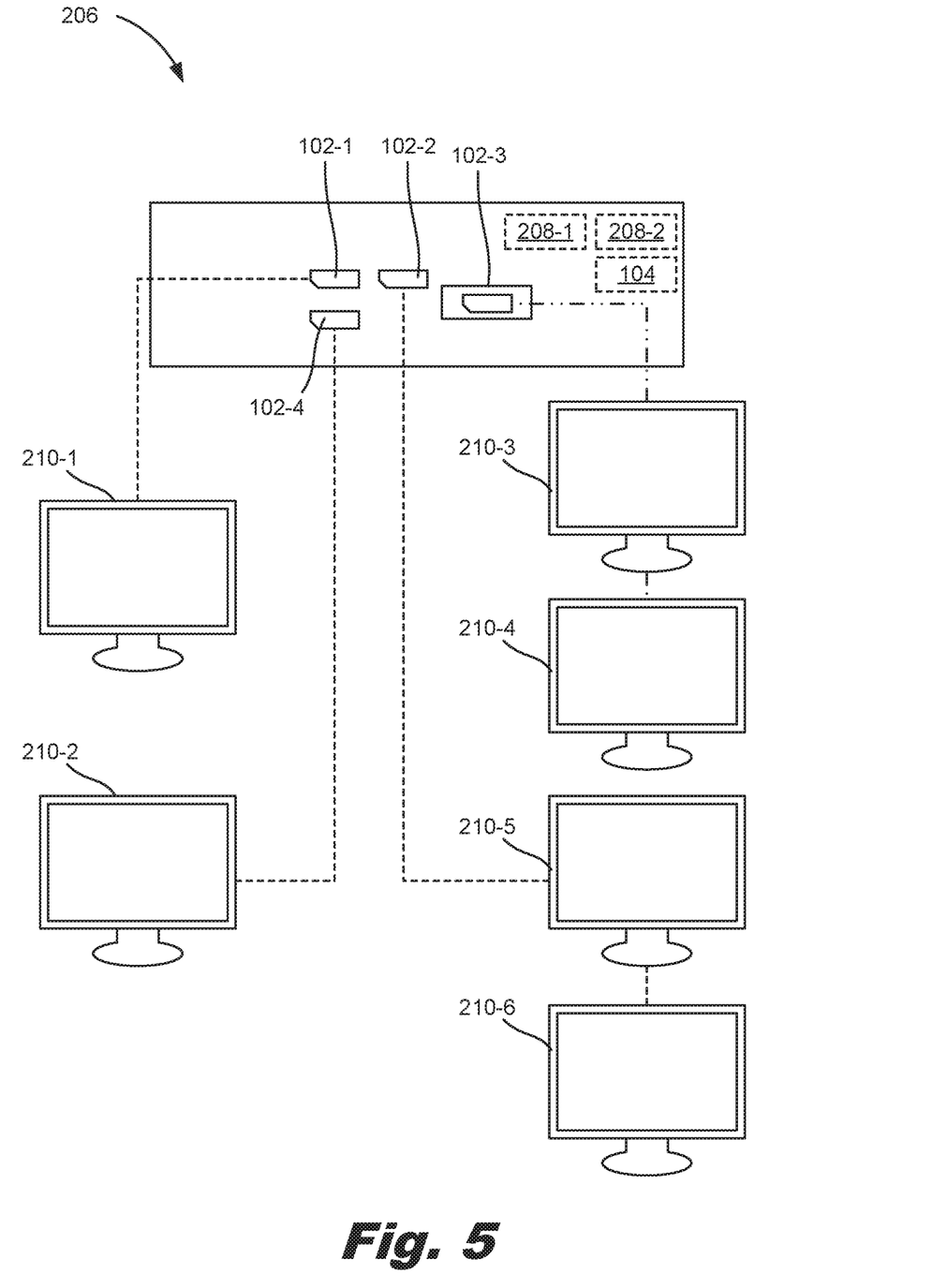
FIG. 5 is a diagram of a computing device for switching graphics processors based on coupled display devices, according to an example of the principles described herein.

In this example, the system (100) may automatically enable the second graphics processor and switch one of the ports (102) to be driven by this second graphics processor. Specifically, the system (100) includes a controller (104) to determine when a number of coupled display devices is greater than the number of display devices supported by the first graphics processor. When this occurs, the controller (104) switches the first port (102) from being driven by the first graphics processor to being driven by the second graphics processor. Doing so provides support for more display devices than are supported by the first graphics processor. For example, if the first graphics processor supports four display devices as depicted in FIG. 2, but two more are added as depicted in FIG. 5 in a daisy-chain fashion, then the controller (104) may switch one of the ports (102) to be driven by the second graphics processor while the other ports (102) remain driven by the first graphics processor, thus enabling all display devices to be driven by the system (100).

As yet another example, suppose a computing device has six display ports (102) and a first graphics processor that supports five display devices. In this example, a sixth display device is coupled to the sixth display port (102), which is more than can be supported by the first graphics processor. Accordingly, one of the six ports may be switched from being driven by the first graphics processor to being driven by the second graphics processor to ensure that each of the six display devices can be used.

Figure 2:
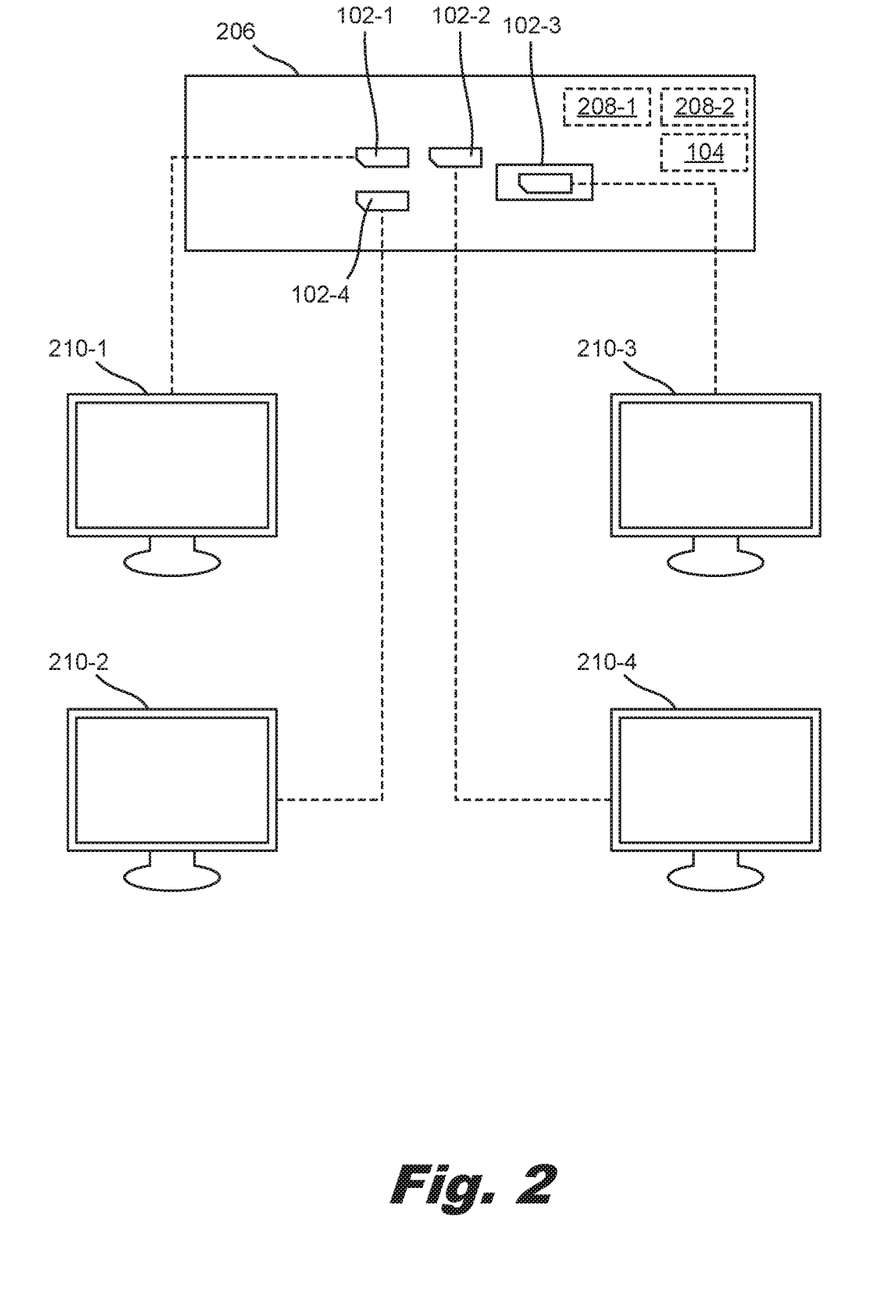
FIG. 2 is a diagram of a computing device for switching graphics processors based on coupled display devices, according to an example of the principles described herein.

FIG. 2 is a diagram of a computing device (206) for switching graphics processors (208) based on coupled display devices (210), according to an example of the principles described herein. That is, the computing device (206) includes the system (FIG. 1, 100) with its multiple ports (102). While FIG. 2 depicts four ports (102-1, 102-2, 102-3, 102-4), the computing device (206) may include more or less ports (102). Each of the ports (102) receives a connection of a respective display device (210-1, 210-2, 210-3, 210-4). While FIG. 2 depicts the display devices (210) as desktop monitors, the display devices (210) may be of a variety of types including projectors or any other video output device.

Each of the ports (102) may communicate via a particular protocol such as those described above. In one example, one of the ports (102), for example a third port (102-3) depicted in FIG. 2 may be a modular port (102) that can support any of a variety of display protocols. That is, this port (102) may be an interchangeable/modular port interface that can support multiple display protocols, depending on the type of module installed and the port type supplied by that module. Examples of different protocols include DisplayPort, VGA, DVI, HDMI, USB Type-C Alt Mode, or USB Converged 10.

FIG. 2 also depicts the graphics processors (208-1, 208-2) and the controller (104) in ghost to indicate their position internal to the computing device (100) housing. As described above, the different graphics processors (208-1, 208-2) may have different capabilities with a first graphics processor (208-1) having higher processing capabilities and thereby takes a higher priority to drive the ports (102) to which it is coupled.

Figure 3:
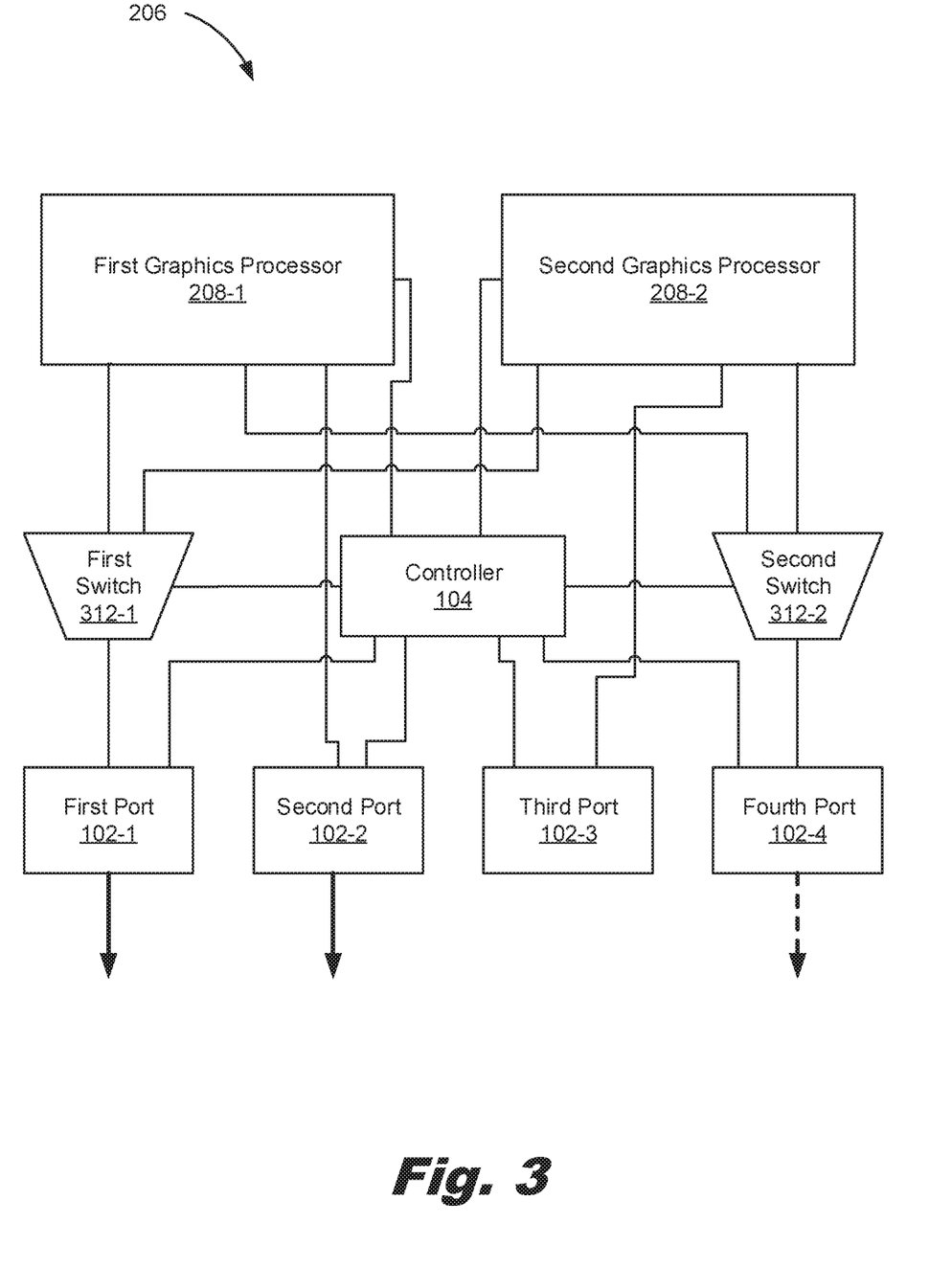
FIG. 3 is a schematic diagram of a system device for switching graphics processors based on coupled display devices, according to an example of the principles described herein.

FIG. 3 is a schematic diagram of a computing device (206) for switching graphics processors (208-1, 208-2) based on coupled display devices (FIG. 2, 210), according to an example of the principles described herein. As described herein, the computing device (206) includes the system (FIG. 1, 100) which includes the controller (104) and various ports (102). The computing device (206) also includes multiple graphics processors (208-1, 208-2). In some examples, one may be an installed graphics processor meaning, a separate standalone processor that is installed in the computing device (206). In some examples, the first, or installed, graphics processor (208-1) may be a third-party graphic processor and/or may have more processing capabilities resulting in a different quality output at the respective display device (FIG. 2, 210).

The other graphics processor, i.e., the second graphics processor (208-2) may be an integrated graphics processor which may be installed by a manufacturer and may be a lower-capability graphics processor. In the example in FIG. 3, the controller (104) is depicted as a discrete component. However, in some examples, the controller (104) may be integrated with one or both of the graphics processors (208). As such, the communication and operation of the controller (104) described below will be the same whether the controller is a discrete integrated circuit, or part of the integrated circuits that form the graphics processors (208).

As described above, in some examples, some or all of the ports (102) may be coupled to both graphics processors (208). That is, in addition to a first port (102-1) that is coupled to both graphics processors (208), one or multiple other ports (102) may be coupled to the first graphics processor (208-1) and the second graphics processor (208-2). For example, the first port (102-1) and the fourth port (102-4) may be coupled to both the first graphics processor (208-1) and the second graphics processor (208-2), via respective switches (312-1, 312-2).

That is, the system (100) may include switches (312) to switch an electrical connection of the first port (102-1), and any other port (102) that is coupled to both graphics processors (208), between the first graphics processor (208-1) and the second graphics processor (208-2).

In this example, the switches (312) are communicatively coupled to the controller (104) and are triggered thereby. For example, the controller (104) may include circuitry to receive a signal when a display device (FIG. 2, 210) is inserted into a port (102). That is, upon insertion of a connector of a display device (FIG. 2, 210) into a port (102), an electrical connection is established which is detected by the controller (102). When the number of detected display devices (FIG. 2, 210) is less than the number of display devices (FIG. 2, 210) supported by the first graphics processor (208-1), the controller (104) may trigger the switches (312) to couple respective display devices (FIG. 2, 210) to the first graphics processor (208-1). However, when the number of detected coupled display devices (FIG. 2, 210) is greater than the number of display devices (FIG. 2, 210) supported by the first graphics processor (208-1), the controller (104) may trigger one switch (312) to couple one port (102) and respective display devices (FIG. 2, 210) to the second graphics processor (208-2).

In some examples, one port (102) is reserved for at least one of the first graphics processor (208-1) and the second graphics processor (208-2). For example, the second port (102-2) may be reserved to be driven by the first graphics processor (208-1) whereas the third port (102-3) may be reserved to be driven by the second graphics processor (208-2).

A specific example of the operation of the system (100) is now presented. In an initial state, the first graphics processor (208-1) may support two display devices (FIG. 2, 210) and each of the first port (102-1), second port (102-2) and fourth port (102-4) may be driven by the first graphics processor (208-1). In this example, initially a first display device (FIG. 2, 210-1) may be coupled to the computing device (206) via the first port (102-1) and a second display device (FIG. 2, 210-2) may be coupled to the computing device (100) via the second port (102-2).

In this example, a user may desire to attach a third display device (FIG. 2, 210-3) to the computing device (206) even though the first graphics processor (208-1) supports driving one or two display devices (FIG. 2, 210). Accordingly, the user may insert a connector of the third display device (FIG. 2, 210-3) into the fourth port (102-4). In this example, the controller (104) detects the new display device (FIG. 2, 210) and acknowledges that three display devices (FIG. 2, 210) are now coupled to the computing device (206). The controller (104), being communicatively coupled to the first graphics processor (208-1) also knows that the first graphics processor (208-1) supports a maximum of two display devices (FIG. 2, 210). Accordingly, the controller (104) triggers either the first switch (312-1) or the second switch (312-2) to switch the coupling of a respective port (102) to be driven by the second graphics processor (208-2). For example, as a result of the operation of the controller (104), the first port (102-1) may couple a first display device (FIG. 2, 210-1) to the first graphics processor (208-1), the second port (102-2) may couple a second display device (FIG. 2,

210-2) to the first graphics processor (208-1), the third port (102-3) may be unused, and the fourth port (102-4) may couple a third display device (FIG. 2, 210-3) to the second graphics processor (208-2).

Accordingly, in this example, the system (FIG. 1, 100) automatically supports more display devices (FIG. 2, 210) than are supported by the first graphics processor (208-1) alone and does so responsive to the user inserting the additional display device (FIG. 2, 210) connector.

Note that while a particular example of a system adjustment based on a quantity of coupled display devices (FIG. 2, 210) is presented, other examples may be implemented as well, such as that depicted in FIG. 5. That is, the present system (FIG. 1, 100) allows for the interchanging of driving graphics processors (208) per port (102) to allow a customized display environment to be set up.

Figure 4:
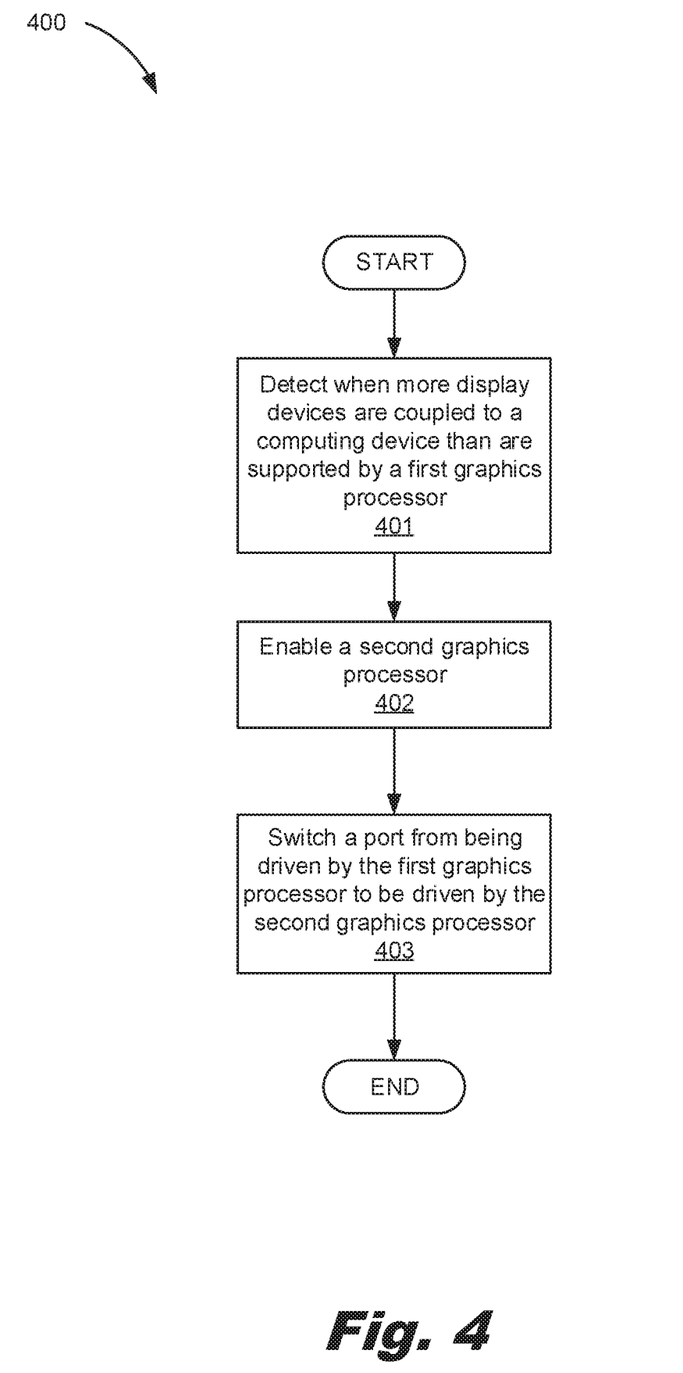
FIG. 4 is a flow chart of a method for switching graphics processors based on coupled display devices, according to an example of the principles described herein.

FIG. 4 is a flow chart of a method (400) for switching graphics processors (FIG. 2, 208) based on coupled display devices (FIG. 2, 210), according to an example of the principles described herein. As described above, the method (400) includes detecting (block 401) when more display devices (FIG. 2, 220) are coupled to a computing device (FIG. 2, 206) than are supported by a first graphics processor (FIG. 2, 208-1) which may be a higher performance graphics processor (FIG. 2, 208) of the computing device (FIG. 2, 206). That is, as described above, an installed graphics processor may have more processing capability than an integrated graphics processor and thus may have priority to drive coupled display devices (FIG. 2, 210). However, it may be desirable to couple more than a number of display devices (FIG. 2, 210) supported by the installed graphics processor to the computing device (FIG. 2, 206).

Accordingly, the controller (FIG. 1, 104) detects when more display devices (FIG. 2, 210) are coupled to the computing device (FIG. 2, 206) than are supported by a first graphics processor (FIG. 2, 208-1) and responsive to this detection, enables (block 402) the second graphics processor (FIG. 2, 208-2) which may be an integrated and lower performance graphics processor. That is, prior to a threshold number of display devices (FIG. 2, 210) being coupled to the computing device (FIG. 2, 206), the second, and perhaps integrated, graphics processor (FIG. 2, 208-2) may be disabled such that all display devices (FIG. 2, 210) are driven by the first higher-performance graphics processor (FIG. 2, 208-1).

The second graphics processor (FIG. 2, 208-2) as compared to the first graphics processor (FIG. 2, 208-1) may have less processing capability such that it is de-prioritized relative to the first graphics processor (FIG. 2, 208-1). However, when the alternative is to not support additional display devices (FIG. 2, 210), the system (FIG. 1, 100) may facilitate the additional number of display devices (FIG. 2, 210) albeit at a lower quality, lower resolution, or lower refresh rate.

The controller (FIG. 1, 104) may also switch (block 402) a port (FIG. 1, 102) from being driven by the first graphics processor (FIG. 2, 208-1) to being driven by the second graphics processor (FIG. 2, 208-2). Without such a switch, the additional display device (FIG. 2, 210) may not be supported. That is, if four display devices (FIG. 2, 210) are supported by the first graphics processor (FIG. 2, 208-1) and four display devices (FIG. 2, 210) are coupled to the computing device (FIG. 2, 208), an additional display device (FIG. 2, 210) would not be supported by the first graphics processor (FIG. 2, 208-1). Accordingly, by switching one of the five display devices (FIG. 2, 210) to be driven by the second graphics processor (FIG. 2, 208-2), all five may be connected and available to the host. Specifically, the first graphics processor (FIG. 2, 208-1) supports its maximum capacity of four and one is supported by the second graphics processor (FIG. 2, 208-2).

In some examples, detecting (block 401) when more display devices (FIG. 2, 210) are coupled to the computing device (FIG. 2, 206) than are supported by the first graphics processor (FIG. 2, 208-1), enabling (block 402) the second graphics processor (FIG. 2, 208-2), and switching (block 403) a display device (FIG. 2, 210) from being driven by the first graphics processor (FIG. 2, 208-1) to being driven by the second graphics processor (FIG. 2, 208-2) are performed responsive to a display device (FIG. 2, 210) being plugged in. That is, rather than relying on user input to trigger a switch, the simple insertion of a display device (FIG. 2, 210) connector triggers the detection, enablement, and switching.

In some examples, detecting (block 401) when more display devices (FIG. 2, 210) are coupled to the computing device (FIG. 2, 206) than are supported by the first graphics processor (FIG. 2, 208-1), enabling (block 402) the second graphics processor (FIG. 2, 208-2), and switching (block 403) a display device (FIG. 2, 210) from being driven by the first graphics processor (FIG. 2, 208-1) to being driven by the second graphics processor (FIG. 2, 208-2) are performed during a startup of the computing device (FIG. 2, 206). For example, during a basic input/output system (BIOS) power-on self-test (POST) phase of operation of the computing device (FIG. 2, 206). As used in the present specification and in the appended claims, the term BIOS refers to a booting stage where hardware initialization occurs. Such initialization may include identification, configuration, testing, and connection of the hardware resources of a computing device (FIG. 2, 206). In some examples, the startup may be during a unified extensible firmware interface (UEFI) phase of operation. Similar to BIOS, UEFI initializes different hardware resources and may be compatible with certain components such as large storage drives.

As a specific example, the BIOS may initialize with the first graphics processor (FIG. 2, 208-1) enabled and the second graphics processor (FIG. 2, 208-2) disabled. During the BIOS POST phase, the controller (FIG. 1, 104) 1) detects the presence of more display devices (FIG. 2, 210) than can be supported by the first graphics processor (FIG. 2, 208-1); 2) enables the second graphics processor (FIGS. 2, 208-2); and 3) switches one of the ports (FIG. 1, 102) to be driven from the second graphics processor (FIG. 2, 208-2) rather than the first graphics processor (FIG. 2, 208-1).

In another example, detecting (block 401) when more display devices (FIG. 2, 210) are coupled to the computing device (FIG. 2, 206) than are supported by the first graphics processor (FIG. 2, 208-1), enabling (block 402) the second graphics processor (FIG. 2, 208-2), and switching (block 403) a display device (FIG. 2, 210) from being driven by the first graphics processor (FIG. 2, 208-1) to being driven by the second graphics processor (FIG. 2, 208-2) are performed during execution of an operating system. That is, the method (400) may be a hot-plug operation where as soon as the additional display device (FIG. 2, 210) is plugged in, the system (FIG. 1, 100) can enable the above-described switches.

As a specific example, the controller (FIG. 1, 104) detects the presence of more display devices (FIG. 2, 210) than can be supported by the first graphics processor (FIG. 2, 208-1) alone and provides a signal to BIOS which receives the signal, enables the second graphics processor (FIG. 2, 208-2), and switches one of the ports (FIG. 1, 102) to be driven from the second graphics processor (FIG. 2, 208-2) rather than the first graphics processor (FIG. 2, 208-1).

FIG. 5 is a diagram of a computing device (100) for switching graphics processors (208) based on coupled display devices (210), according to an example of the principles described herein. In this example, the first graphics processor (208-1) supports four display devices (210) and in an initial state, a first display device (210-1), second display device (210-2), third display device (210-3) and fourth display device (210-4) are coupled to the respective ports (102) of the system (FIG. 1, 100). Note that in this example, a port (102) may be coupled to multiple display devices (210). Specifically, the third display device (210-3) and the fourth display device (210-4) are daisy-chained together.

In this example, a user desires to add more display devices (210), specifically a fifth display device (210-5) and a sixth display device (210-6) even though the first graphics processor (210) supports a maximum of four display devices (210). Accordingly, upon insertion of the connector of the fifth display device (210-5) to the respective second port (102-2), the controller (104) may switch the third port (102-3) to be driven by the second graphics processor (208-2). In the example depicted in FIG. 5, those display devices (210) driven by the first graphics processor (208-1) are indicated with the dashed line while those driven by the second graphics processor (208-2) are indicated with a dash-dot line.

Figure 6:
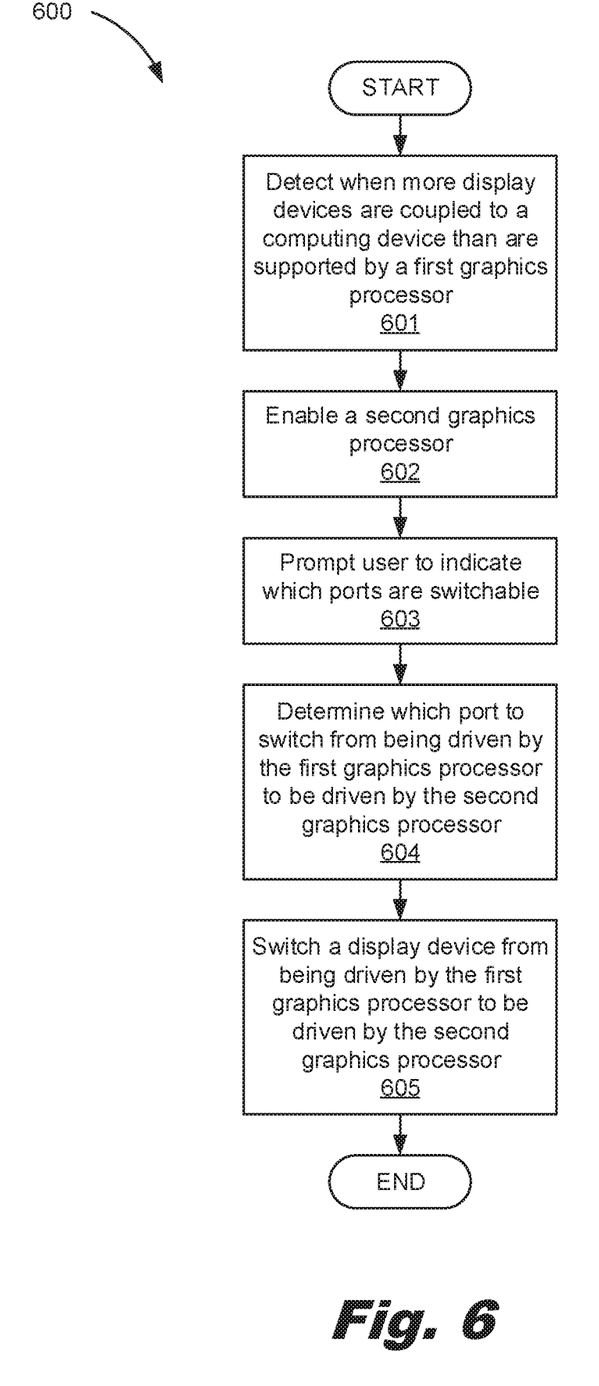
FIG. 6 is a flow chart of a method for switching graphics processors based on coupled display devices, according to an example of the principles described herein.

FIG. 6 is a flow chart of a method (600) for switching graphics processors (FIG. 2, 208) based on coupled display devices (FIG. 2, 210), according to an example of the principles described herein. According to the method (600), it is detected (block 601) when more display devices (FIG. 2, 210) are coupled to the computing device (FIG. 2, 206) than are supported by a first, and higher performance, graphics processor (FIG. 2, 208-1). Responsive to this detection, a second graphics processor (FIG. 2, 208-2) is enabled (block 601). This may be performed as described above in connection with FIG. 4.

In some examples as described above, multiple additional ports (FIG. 1, 102) are coupled to both the first and second graphics processors (FIG. 2, 208) such that multiple ports (FIG. 1, 102) are capable of being switched. Accordingly, in this example, the method (600) includes prompting (block 603) a user to indicate which ports (FIG. 1, 104) are switchable between being driven by the first graphics processor (FIG. 2, 208-1) and the second graphics processor. (FIG. 2, 208-2) That is, for any number of reasons, it may be desirable to reserve a particular port (FIG. 1, 102) for use by just one of the graphics processors (FIG. 2, 208). Accordingly, an interface may be presented to the user that allows the user to indicate which, if any, ports (FIG. 1, 102) are switchable as described herein. In some examples, the prompt may recommend a particular port to be switched. For example, the prompt may recommend the most efficient use of the available graphics processor (FIG. 2, 208) assignments, and may simply seek authorization from the user to execute the suggested configuration.

When multiple ports (FIG. 1, 102) are switchable, the method (600) may include determining (block 604) which port (FIG. 1, 104) to switch from being driven by the first graphics processor (FIG. 2, 208-1) to being driven by the second graphics processor (FIG. 2, 208-2). Such a determination may be based on the user input. For example, if a user specifically designates a subset of the multiple switchable ports (FIG. 1, 104), then the determination may be from amongst that subset. By comparison, if no user input is received, other criteria may be used such as port type. For example, a protocol associated with the port (FIG. 1, 102) may be a criterion for that port (FIG. 1, 102) either being switched or not switched.

Once the determination is made, the display device (FIG. 2, 210) and its respective port (FIG. 1, 102) may be switched (block 605) from being driven by the first graphics processor (FIG. 2, 208-1) to being driven by the second graphics processor (FIG. 2, 208-2). This may be done as describe above in connection with FIG. 4.

As described above, in some examples, display devices (FIG. 2, 210) may be daisy-chained together. In this example, daisy-chained display devices (FIG. 2, 210) may be driven by the same graphics processor (FIG. 2, 208) or different graphics processors (FIG. 2, 208-1, 208-2) following a switch.

For example, turning to an example depicted in FIG. 5 where the first graphics processor (FIG. 5, 208-1) supports five display devices (FIG. 2, 210), when the sixth display device (FIG. 5, 210-6) is connected, a fifth display device (FIG. 5, 210-5) may be switched to be driven by the second graphics processor (FIG. 5, 208-2) while the sixth display device (FIG. 5, 210-6) is driven by the first graphics processor (FIG. 5, 208-1).

In another example, other display devices (FIG. 5, 210) may be switched to the second graphics processor (FIG. 5, 208-2) such that the fifth and sixth display devices (FIG. 5, 210-5, 210-6) remain driven by the same graphics processor (FIG. 5, 208). For example, when the sixth display device (FIG. 5, 210-6) is connected, a second display device (FIG. 5, 210-2) may be switched to be driven by the second graphics processor (FIG. 5, 208-2) such that the fifth and sixth display devices (FIG. 5, 210-5, 210-6) may both be driven by the first graphics processor (FIG. 5, 208-1).

In these examples, the controller (FIG. 1, 104) may determine whether the daisy-chained display devices (FIG. 5, 210) are driven by the same graphics processor (FIG. 5, 208) or by different graphics processors (FIG. 5, 210). In the case that the daisy-chained display devices (FIG. 5, 210) are to be driven by the same graphics processor (FIG. 5, 208), for example, both by the first graphics processor (FIG. 5, 208-1), the controller (FIG. 1, 104) may determine which of the other display devices (FIG. 5, 210) currently being driven by the first graphics processor (FIG. 5, 208-1) are to be switched to the second graphics processor (FIG. 5, 208-2).

In some examples, the determination about which display device to switch to the second, and in some examples integrated, graphics processor (FIG. 5, 208-2) may be based on any number of criteria. In one particular example, the criteria is a resolution at which the graphics processor (FIG. 5, 208) is able to drive the display devices (FIG. 5, 208).

For instance, a first graphics processor (FIG. 5, 208-1) may be able to drive up to four display devices (FIG. 5, 208), where two of those displays can have 4 k resolution and two are at 2K resolution and the second graphics processor (FIG. 5, 208) may support just 2K resolution. In this example, if a fifth display device (FIG. 5, 208-5), daisy-chained or not, is connected and is a 4K display, then the controller (FIG. 1, 104) may rearrange the display streams such that the additional 4K display device (FIG. 5, 208) is coupled to the first graphics processor (FIG. 5, 208-1) which supports its 4K resolution. In this example, one of the other display devices (FIG. 5, 208-1, 208-2, 208-3, 208-4) coupled to the first graphics processor (FIG. 5, 208-1) may be bumped to the second graphics processor (FIG. 5, 208-2).

Figure 7:
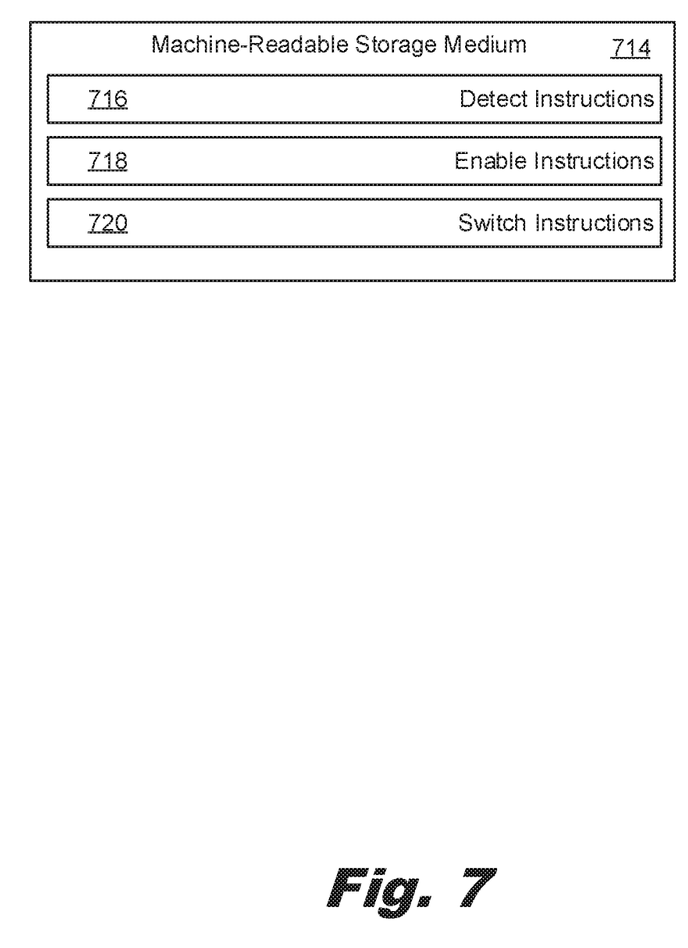
FIG. 7 depicts a non-transitory machine-readable storage medium for switching graphics processors based on coupled display devices, according to an example of the principles described herein.

FIG. 7 depicts a non-transitory machine-readable storage medium (714) for switching graphics processors (FIG. 2, 208) based on coupled display devices (FIG. 2, 210), according to an example of the principles described herein. To achieve its desired functionality, a computing system includes various hardware components. Specifically, a computing system includes a processor and a machine-readable storage medium (714). The machine-readable storage medium (714) is communicatively coupled to the processor. The machine-readable storage medium (714) includes a number of instructions (716, 718, 720) for performing a designated function. The machine-readable storage medium (714) causes the processor to execute the designated function of the instructions (716, 718, 720). The instructions (716, 718, 720) are executable responsive to plugging in a display device (FIG. 2, 210) to a system (FIG. 1, 100) port (FIG. 1, 102).

Detect instructions (716), when executed by the processor, cause the processor to detect when more display devices (FIG. 2, 210) are coupled to the computing device (FIG. 2, 206) than are supported by a first graphics processor (FIG. 2, 208-1) of the computing device (FIG. 2, 206). Enable instructions (718), when executed by the processor, may cause the processor to, enable a second graphics processor (FIG. 2, 208-2). Switch instructions (720), when executed by the processor, may cause the processor to, switch a display device (FIG. 2, 210) from being driven by the first graphics processor (FIG. 2, 208-1) to be driven by the second graphics processor (FIG. 2, 208-2).

Such systems and methods 1) enhance low-frequency output of certain audio output devices; 2) avoid intermodulation distortion; and 3) can be implemented in a number of small electronic devices, as examples.

What is claimed is:

1. A system, comprising:
a number of ports, each port to receive a connection to a display device, wherein a first port and a second port are coupled to a first graphics processor, and wherein the first graphics processor supports a number of display devices; and
a controller to:
determine when a number of coupled display devices is greater than the number of display devices supported by the first graphics processor; and
switch the first port from being driven by the first graphics processor to be driven by a second graphics processor while maintaining the second port being driven by the first graphics processor.

2. The system of claim 1, wherein the second graphics processor is to be disabled when the number of coupled display devices is less than the number of display devices supported by the first graphics processor.

3. The system of claim 1, further comprising a switch associated with the first port to switch an electrical connection of the first port between the first graphics processor and the second graphics processor.

4. The system of claim 1, wherein multiple ports are coupled to the first graphics processor and the second graphics processor.

5. The system of claim 1, wherein a port of the number of ports is reserved for at least one of the first graphics processor and the second graphics processor.

6. The system of claim 1, wherein a port of the number of ports is coupled to multiple display devices.

7. The system of claim 6, wherein at least a first display device and a second display device of the multiple display devices are connected in a daisy-chain.

8. The system of claim 1, wherein a port of the number of ports is a modular port to support one of a set of graphics protocols.

9. A method, comprising:
detecting when more display devices are coupled to a computing device than are supported by a first graphics processor of the computing device;
responsive to a detection that more display devices are coupled than are supported:
enabling a second graphics processor; and
switching a first port from being driven by the first graphics processor to be driven by the second graphics processor while maintaining a second port being driven by the first graphics processor.

10. The method of claim 9, wherein detecting when more display devices are coupled to the computing device than are supported by the first graphics processor, enabling the second graphics processor, and switching the first port from being driven by the first graphics processor to be driven by the second graphics processor are performed responsive to a display device being plugged into a port.

11. The method of claim 9, wherein:
multiple additional ports are coupled to the first graphics processor and the second graphics processor; and
the method further comprises determining which port to switch from being driven by the first graphics processor to be driven by the second graphics processor.

12. The method of claim 9, wherein detecting when more display devices are coupled to the computing device than are supported by the first graphics processor, enabling the second graphics processor, and switching the first port from being driven by the first graphics processor to be driven by the second graphics processor are performed during a startup of the computing device.

13. The method of claim 9, wherein detecting when more display devices are coupled to the computing device than are supported by the first graphics processor, enabling the second graphics processor, and switching the first port from being driven by the first graphics processor to be driven by the second graphics processor are performed during execution of an operating system.

14. The method of claim 9, further comprising prompting a user to indicate which ports are switchable between being driven by the first graphics processor and the second graphics processor.

15. A non-transitory machine-readable storage medium encoded with instructions executable by a processor, the non-transitory machine-readable storage medium comprising instructions to:
responsive to a display device being plugged in to a port of a computing device:
detect when more display devices are coupled to the computing device than are supported by an installed graphics processor of the computing device;
enable an integrated graphics processor; and
switch a first port from being driven by the installed graphics processor to be driven by the integrated graphics processor while maintaining a second port being driven by the installed graphics processor.

16. The non-transitory machine-readable storage medium of claim 15, wherein the instructions are executed during a basic input/output system (BIOS) phase of operation of the computing device.

* * * * *